United States Patent
Bravo Avina

(10) Patent No.: US 11,115,485 B2
(45) Date of Patent: Sep. 7, 2021

(54) NETWORK-BASED SYSTEM FOR CONNECTING MOBILE NETWORK USERS

(71) Applicant: Cristobal Bravo Avina, Salinas, CA (US)

(72) Inventor: Cristobal Bravo Avina, Salinas, CA (US)

( * ) Notice: Subject to any disclaimer, the term of this patent is extended or adjusted under 35 U.S.C. 154(b) by 0 days.

(21) Appl. No.: 16/519,316

(22) Filed: Jul. 23, 2019

(65) Prior Publication Data

US 2020/0028922 A1 Jan. 23, 2020

Related U.S. Application Data

(60) Provisional application No. 62/702,140, filed on Jul. 23, 2018.

(51) Int. Cl.
H04L 29/08 (2006.01)

(52) U.S. Cl.
CPC ............ *H04L 67/18* (2013.01); *H04L 67/141* (2013.01); *H04L 67/147* (2013.01); *H04L 67/306* (2013.01)

(58) Field of Classification Search
CPC ... H04L 67/306; H04L 67/141; H04L 67/147; H04L 67/18
See application file for complete search history.

(56) References Cited

U.S. PATENT DOCUMENTS

| | | | | |
|---|---|---|---|---|
| 10,321,284 B1* | 6/2019 | France | .................. | H04W 4/06 |
| 10,382,538 B1* | 8/2019 | Chummun | .............. | H04W 4/21 |
| 2005/0227676 A1* | 10/2005 | De Vries | ................. | H04L 29/06 |
| | | | | 455/414.1 |
| 2006/0047825 A1* | 3/2006 | Steenstra | ................ | H04L 67/04 |
| | | | | 709/229 |
| 2007/0186007 A1* | 8/2007 | Field | ...................... | G06Q 30/02 |
| | | | | 709/233 |
| 2008/0102856 A1* | 5/2008 | Fortescue | ............. | H04W 4/029 |
| | | | | 455/456.1 |
| 2009/0164464 A1* | 6/2009 | Carrico | ................... | G06Q 50/10 |
| 2014/0074824 A1* | 3/2014 | Rad | ......................... | G06Q 10/10 |
| | | | | 707/722 |
| 2015/0261844 A1* | 9/2015 | Ramalho | ............... | H04W 4/023 |
| | | | | 707/749 |
| 2016/0127500 A1* | 5/2016 | Rad | ......................... | G06Q 50/01 |
| | | | | 715/733 |
| 2016/0248864 A1* | 8/2016 | Loia | ......................... | G06Q 50/01 |
| 2016/0364455 A1* | 12/2016 | Singer | ..................... | G06Q 50/01 |
| 2017/0019488 A1* | 1/2017 | Memon | .................. | H04W 4/021 |
| 2017/0134919 A1* | 5/2017 | Nordstrom | .............. | H04W 4/12 |

* cited by examiner

*Primary Examiner* — Benjamin M Thieu
(74) *Attorney, Agent, or Firm* — Donald R. Boys; Central Coast Patent Agency LLC

(57) ABSTRACT

A social interaction system has a server executing software coupled to a data repository storing member profiles, portable appliances used by members, and executing GPS, and an application providing interactive interfaces on a touch screen of the portable appliances, wherein the system stores pre-programmed geographic regions by GPS coordinates, and wherein, upon a first member becoming active by logging into the application using the network-connected portable appliance, the system invites the first member to select one or more interests presented in an interactive interface, and upon the user selecting one or more interests, indicates to the first member an on-screen identifier for other members who are both active in the same region, and who have selected an interest common to one of the interests selected by the first user.

6 Claims, 17 Drawing Sheets

NETWORK-BASED SYSTEM FOR CONNECTING MOBILE NETWORK USERS

CROSS-REFERENCE TO RELATED DOCUMENTS

The present patent application is a Non-provisional application of Provisional application Ser. No. 62/702,140, filed on Jul. 23, 2018, and titled "Network-Based System for Connecting Mobile Network Users".

BACKGROUND OF THE INVENTION

1. Field of the Invention

The present invention is in the field of network-based communications, including Internet protocol (IP), communications and pertains particularity to a network-based system and social media application for matching users who currently share one or more common interests in a specific activity or event.

2. Description of Related Art

With the advent of the Internet network, social media websites have been created to enable users to join such sites for the general purpose of interacting with one another over a network using electronic devices capable of accessing the network. Of the many types and varieties of social interaction sites are Web sites that match sets of data or information from two separate user accounts (users) together and form at least a recommendation that the two users should at least consider an idea of interacting according to the activity subject matter promoted by the Web site. A couples matching Web site is one such example.

It has occurred to the inventor that mobile network users have personal wireless devices they use to access the Internet, make phone calls, send text messages, record and upload audio and video, and record and upload still images. People who may be socially adept at meeting other people of like interests in certain activities may rely on a contact list with presence information about contacts the user has made wherein that presence information only includes the data that a user is on the network and the user's current GPS location. A user seeking to meet and do an activity with the other user on his or her list of contacts must engineer the opportunity and invitation after determining the activity the other user may be invited to participate in. This ad hock method may be performed over a cellular network with no Internet broker. Some short-range wireless networks have been used to enable users belonging to a Website to discover one another while monitoring through their devices, and after discovery may then agree to exchange messages or information with one another. In such instances a picture may be exchanged or made part of a profile graphic.

Some social media platforms such as Facebook for example, have profile pages and a news feed where friends of a user may be discovered online. A person seeking to invite someone to engage in a local activity may use such platforms to post such an invite to anyone who may see the invite. This is an ad hock method as well and not necessarily a secure method.

Therefore, what is clearly needed in the art is a network-based system and social media application for matching users who currently share one or more common interests in a specific activity or event.

BRIEF SUMMARY OF THE INVENTION

In an embodiment of the invention a social interaction system is provided, comprising a network-connected server executing software from a non-transitory medium coupled to a data repository storing member profiles including at least an image and a personal description for the member, a plurality of network-connected portable appliances by which members are enabled to communicate with the server and with one another, each portable appliance executing a global-positioning system GPS application, and an application executing on individual ones of the portable appliances, the application providing interactive interfaces on a touch screen of the portable appliances by which members are enabled to interact with functions of the server provided through execution of the software at the server. The system stores pre-programmed geographic regions by GPS coordinates, and upon a first member becoming active by logging into the application using the network-connected portable appliance, the system invites the first member to select one or more interests presented in an interactive interface, and upon the user selecting one or more interests, indicates to the first member an on-screen identifier for other members who are both active in the same region, and who have selected an interest common to one of the interests selected by the first user.

In one embodiment the system provides to every member in the region an on-screen indicator for all other members active in the same region who have selected a common interest. Also, in one embodiment the on-screen indicator for active members with a common interest is a photograph of each such member. In one embodiment there are a plurality of photographs of members active in the region with a common interest, and the first member is enabled in the interactive interface to scroll through the plurality of photographs. And in one embodiment the first member is enabled in the interactive interface to access a personal profile of individual members active in the same region having indicated a common interest, the profile created by the member, the personal profile sans contact information.

In one embodiment the first member is enabled by a specific touchscreen action to communicate to the system at the server an interest in one of the other members active in the same region and having indicated a common interest. Also, in one embodiment the specific touchscreen action is a finger touch upsweep. Also, in one embodiment the system, having received, by the specific touchscreen action, an indication of interest by the first member in a second member active in the same region and having indicated a common interest, and an indication of interest by the second member by the specific touchscreen action in the first member, declares a match of the first and the second member. In one embodiment, upon a match being declared between the first and the second member, the first and the second member are enabled to communicate directly through the application between their respective portable appliances, without sharing private contact information, which may be shared through the communication by the first and the second member. And in one embodiment the first member is enabled in the interactive interface to communicate a request to the system at the server to declare a match with a second member active in the same region having indicated a common interest, and wherein the system, in response, communicates the request for a match to the second member with an invitation to accept or reject, and upon the second member accepting the request for a match, the system declares a match between the first and the second member, and enables direct communication between the first and the second member through their respective portable appliances, without sharing contact information.

In another aspect of the invention a social interaction method is provided, comprising storing member profiles including at least an image and a personal description in a data repository coupled to a network-connected server executing software from a non-transitory medium, providing an application in network-connected portable appliances having GPS capability, operated by members for which profiles are stored, the application when executing enabling the members to communicate with the server through interactive interfaces provided on a touchscreen of the potable appliances, upon a member becoming active in a geographic region by logging into the application, enabling the first member to select one or more interests in links displayed to the first member, and indicating to the first member by indicators on the touchscreen of the portable appliance used by a first member, other members active in a same geographic region of a plurality of pre-programmed geographic regions, who have selected a common interest upon becoming active in the region.

In one embodiment the method comprises the system providing to every member in the region an on-screen indicator for all other members active in the same region who have selected a common interest. Also, in one embodiment the method comprises displaying photographs as indicators for active members with a common interest. IN one embodiment the method comprises a scrolling process for the first member to access the photographs of other active in the region with a common interest, and the first member is enabled in the interactive interface to scroll through the plurality of photographs. And in one embodiment the method comprises displaying to the first member a personal profile of individual members active in the same region having indicated a common interest, the profile created by the member, the personal profile sans contact information.

In one embodiment the method comprises communicating by the first member to the system at the server an interest in one of the other members active in the same region and having indicated a common interest. IN one embodiment the method comprises the first member indicating an interest in another member active in the same region and having a common interest, by a finger touch upsweep on an indicator of the other member. In one embodiment the method comprises the system, having received, by the specific touchscreen action, an indication of interest by the first member in a second member active in the same region and having indicated a common interest, and an indication of interest by the second member by the specific touchscreen action in the first member, declaring a match of the first and the second member. IN one embodiment the method comprises the system, upon a match being declared between the first and the second member, enabling the first and the second member to communicate directly through the application between their respective portable appliances, without sharing private contact information, which may be shared through the communication by the first and the second member. And in one embodiment the method comprises enabling the first member to communicate a request to the system at the server to declare a match with a second member active in the same region having indicated a common interest, and the system, in response, communicates the request for a match to the second member with an invitation to accept or reject, and upon the second member accepting the request for a match, the system declares a match between the first and the second member, and enables direct communication between the first and the second member through their respective portable appliances, without sharing contact information.

DETAILED DESCRIPTION OF THE INVENTION

Figure 1:
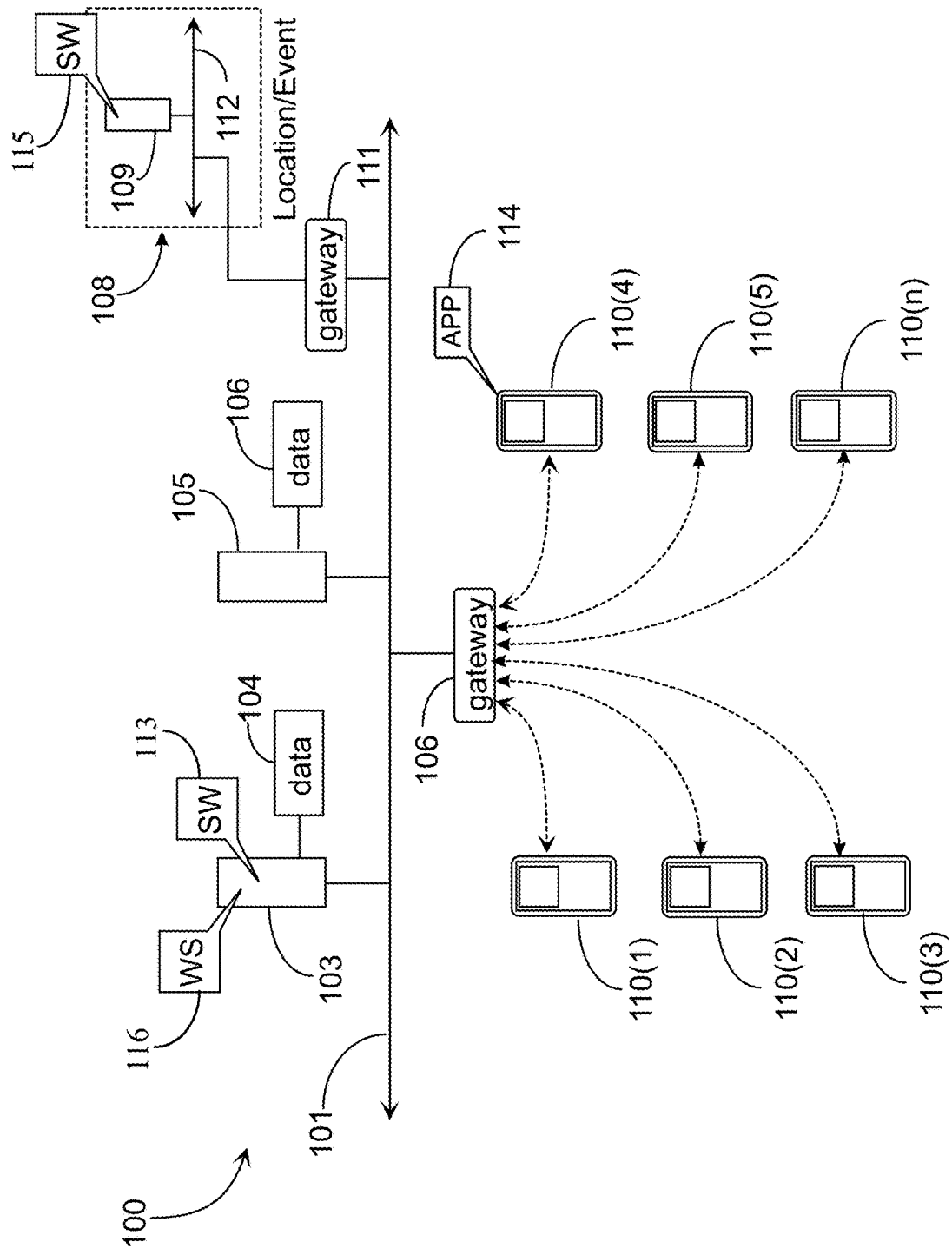
FIG. 1 is an architectural diagram of a communications network supporting real time matching of mobile users in an embodiment of the invention.

FIG. 1 is an architectural diagram of a communications network 100 supporting real-time matching of mobile users according to at least one common interest, in an embodiment of the invention. Communications network 100 may include an Internet network referenced herein as Internet network backbone 101. Network backbone 101 represents the lines, equipment, and access points that make up the Internet network. Network 101 may also be a wide area network (WAN) that is a corporate WAN or a private WAN. In one embodiment, network 101 may be a campus area network (CAN) or a municipal area network (MAN).

It is noted herein that mobile wireless network connectivity may be used in communications between users and the system of the invention. Therefore, it may be assumed that network backbone 101 includes sub-networks such as wireless carrier networks (WCN). In this embodiment, mobile users 110(1-n) are depicted as using mobile smart phones.

Other devices may be substituted therefor, such as a laptop or other personal electronic computing device having at least a processor, data storage capacity, data network connect capability, a display screen, a data input device, video/audio recording capabilities, and in a preferred embodiment telephony communications capability. Users 110(1-n) are meant to represent any plurality of network-connected users.

Users 110(1-n) in this example connect to network backbone 101 through a network gateway 106 through an Internet or network service provider (not illustrated). As there may be many more than the users shown, there may also be other gateways of various sorts through which users connect.

Network backbone 101 supports an information server 103 hosted by an enterprise providing services in an embodiment of the present invention. Information server 103 may be a web server hosting a web site (WS) 116. Web site 116 may be a service access point for users 110(1-n). Therefore, users may access server 103 through gateway 106, or other gateways not shown, from a mobile device and may register with the host of site 116 to access matching services according to embodiments of the invention.

Sever 103 has connection to at least one data repository 104. Data repository 104 may include data about registered users of WS 116, which data may be recorded as profiles associated with individual users. Such data may include username, user password, billing history, interest in one or more activities, and other data deemed important to secure for a registered user of WS 116. Server 103 may also be a data processing server and may include a software application 113. Software (SW) 113 is adapted to match at least one user 110 to one or more other users 110, which matching may be based on common interests/activity information selected and or submitted to the web site by the requesting users, and also on geographic proximity.

A unique aspect of the matching system is that it is on demand by users. More particularly a user may select interest or activity preferences preprogrammed in the system and the system may aggregate both information about other users with common interests, and nearby locations where such activities and interests might be accommodated. Any user may interact at any time to match with one or more other individuals registered with the system and interact to engage in an activity or interest.

WS 116 and server SW 113 may be accessed from mobile devices 110(1-n) executing a client application (APP) 114 running on the mobile device. One device 110 is illustrated as executing app 114, but it is to be understood that all devices serving users will be executing a version of app 114. Application 114 is adapted to enable users 110 seamless connection and interaction with server 103 and WS 116. Network backbone 101 supports global positioning satellite (GPS) tracking server 105 having connection to at least one data repository 106. The matching service of the present invention uses GPS data from mobile devices for determining real time positions of registered users to aid in determining where potential matches for a requesting user may be at the time of interaction by a user.

A location 108 is depicted in this architecture and represents any geographic location that may host an activity or event. Location 108 is not limited to having a single address or GPS signature. For example, an event may include multiple locations that cooperate to sponsor or host an event. A use case may be a cultural festival where several different businesses are open and offering event-related discounts and services. Therefore, the term location may be a single address or multiple addresses without departing from the spirit and scope of the invention.

Enterprises and event venues, as well as commercial businesses like restaurants, bars, dance clubs, and venues of a wide variety may register with the hosting enterprise of server 103 and site 116. Registered enterprises have an inventive to be registered members, as matches between individual users will often lead to activity by the users at a site operated by one of the registered business enterprises. As a vet narrow example, in a match between users, the common interest may be to see a movie, and the users may interact to pay to see the movie together at a movie house hosted by one of the registered business interests.

Location 108 for the sake of description may represent a single geographic location. Location 108 may be a location that promotes a specific activity such as shooting, for example, wherein location 108 is a gun firing range. Matching users may own a firearm and may have interest in shooting activity and may interact to meet at the firing range for an afternoon of sport with the firearms. Many other examples exist such as location 108 representing a fun center, a horse racing track, an aqua sports complex, a soccer complex, and so on. Location 108 may also be a bar, a restaurant, a park, some one's private property, a lake, a hiking trail, a strip of beach, a section of river, a boardwalk, etc. Location 108 may be a permanent location or a temporary one like a county fair, or a summer concert.

Location 108 may include a local area network (LAN) 112 having data connection to network backbone 101 through a network gateway 111. LAN 112 in this example supports an information server 109. Information server 109 is adapted to maintain and provide information about the location, services and events available at the location, directions to the location, and so on. Server 109 is enhanced to practice the invention by a SW application 115. Application 115 may be a client application to application 113 on server 103. Application 115 may work in cooperation with application 114 and parent application 113 to enable users to browse information from an information profile, to check in to that location electronically and to upload information to a web site or information storyboard showing current events, and which users registered with WS 116 may be spending time at that location. Location 108 has a GPS coordinate. In any given locality, the matching system of the invention can determine where registered users that are connected to the network and server are at any given time. The matching system of the invention can also determine where locations are relative to the registered users.

In general use of the present invention, a user such as any user 110 registered with web site 116 may at any time connect to server 103 through application 114. The connecting user has a GPS location, and is associated with specific interests in his or her profile. The system, as this user connects associates the connecting user with a region defined by, in some cases a physical radius, say 1 mile. The system will show this connecting user indication of other users, if any, that connect in the same region and have a common interest. The other users also are shown indication of the first user mentioned here, as well as all other users that are in the region and have a common interest.

The first user mentioned may select one, or in some cases, more than one, of the other users connected in the region with at least one common interest. Any of the connected users may indicate through interaction with server 103 an interest in another connected user with a common interest. This indication of interest between users may be, for example, an up swipe on a picture of the other connected user. A single swipe on a user's indicator by another user is not communicated at that time to the other user. If, however one connected user upswipes another user's indicator, and that other user also upswipes the first users indicator, even with a time delay, a match is made, and both users get an indication from the server that there is a match, and a communication channel is opened between the two.

The communication channel may be a cell connection, a chat session, a text connection, or a combination of such, and may be subject to selection by the matched users. Once a match is made, the matched users may have access to locations (see element 108) where a common activity that brought the two (or more) together in a match may be practiced. Further description of this functionality if provided in enabling detail below.

Figure 2:
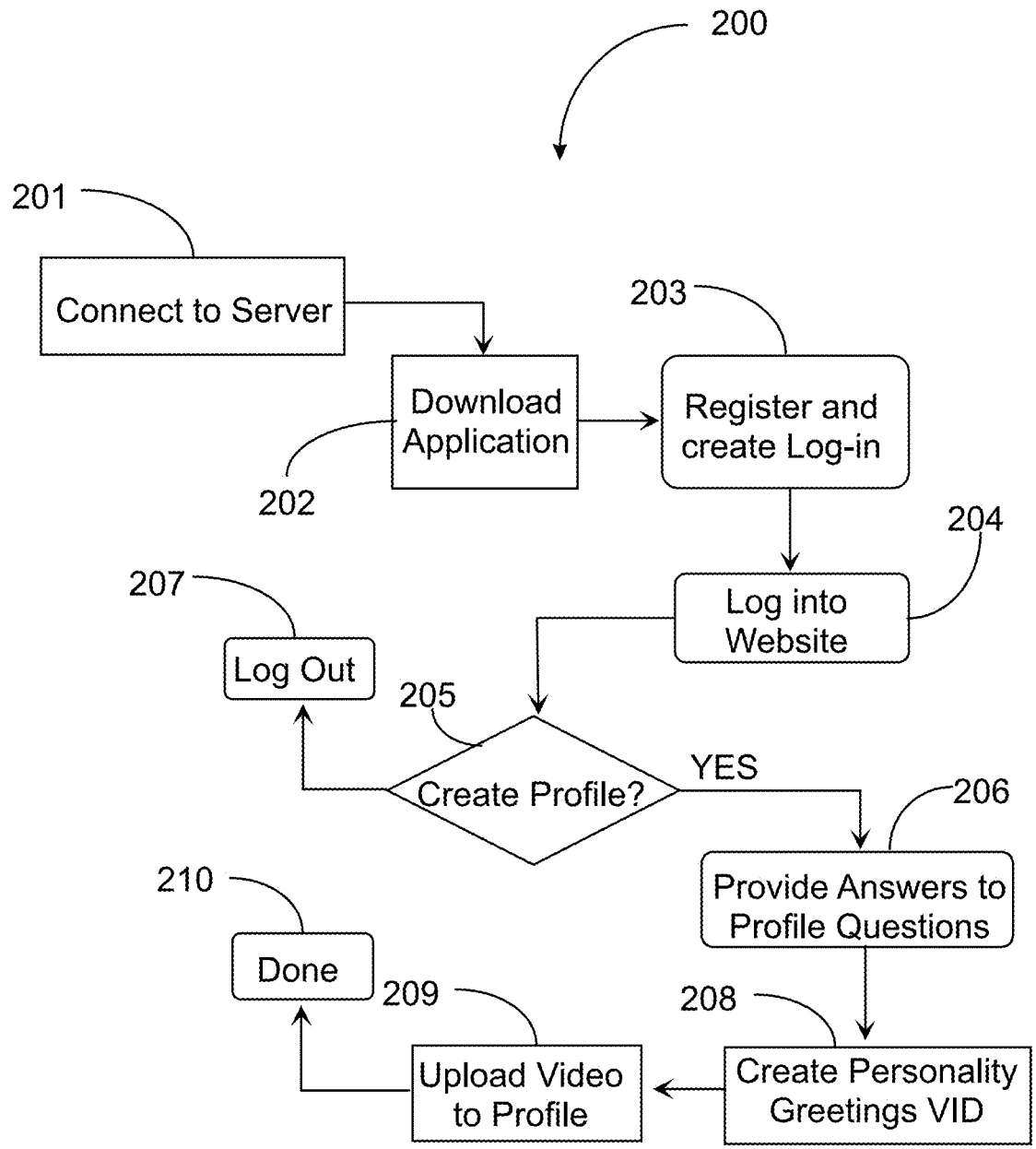
FIG. 2 is a process flow chart depicting steps for setting up an account with a user-matching service according to an embodiment of the present invention.

FIG. 2 is a process flow chart 200 depicting steps for setting up an account with a user-matching service according to an embodiment of the present invention. At step 201, a user with a network capable communications device such as a smart phone may connect to a sever hosted web site and download a client application like application 114 of FIG. 1 at step 202. The downloaded application may self-execute and install itself on the mobile device of the user. The application may present a user interface that enables the user to transact with the web server through the downloaded application.

At step 203, the user may follow instructions to register for the matching service including creating a security password and username for log-in to the web service. At step 204, the user may securely log into the matching service through the client application. In one embodiment, a user may log in through a social media network such as Instagram, Facebook, or Snapchat, for example. In such cases a user may allow the matching service to use information and photos from their established social media profiles, including transfer of those to a user profile being created. In another embodiment users may register through email and create a profile.

Once logged into the matching service, the user may be asked if they would like to create a user profile at step 205. If the user does not desire to create a profile at that time the process may skip to step 207 where the user may log out. It is noted herein that the user may not use the service without creating the required user profile. If the user decides to create a user profile at step 205, then the user may be presented with interactive profile questions and may provide the answers to them at step 206. The profile questions may include gender, age, name, etc. for providing limited identification to a user who might browse profiles of other users. The registering user may provide photos for the profile as well. At step 208, the user may create a short audio/video presentation of themselves characterized as a personal greetings video. Such a video may be created during the registration process to provide users with an opportunity to be introduced to other users. The user may upload a completed greetings video to the matching service at step 209. In one embodiment, users are restricted from uploading any audio/video from a cache or from a peripheral device or from a separate device that may not belong to the user. The user may have the ability to customize their video with filters, stickers, gifs, or animations.

In one embodiment, the matching service may monitor an audio/video recording process on the user device and may confirm via time stamp and other methods that a user has just recorded a required greetings video, and therefore may confirm the recording is authentic and from the registered user. At step 210, the process is complete for the user and the user is now ready to consider a match. It is noted herein as well that the user may also upload photos created on the mobile device using the device camera through the client application analogous to application 114 FIG. 1. Such photos may along with the greetings video comprise a multimedia profile available to other users. A user may also provide a short biography, where the user might provide some additional personal information such as birthplace, education history, professional history, main philosophy or interests, etc.

The skilled person will understand that the process illustrated by FIG. 2 in setting up a profile for a registered user of the system in an embodiment of the invention is exemplary, and the profile will not necessarily be limited to the elements discussed relative to FIG. 2. profiles may contain a variety of other information and data as well. In embodiments of the invention a very important component of a registered user's profile is personal interests.

Figure 3:
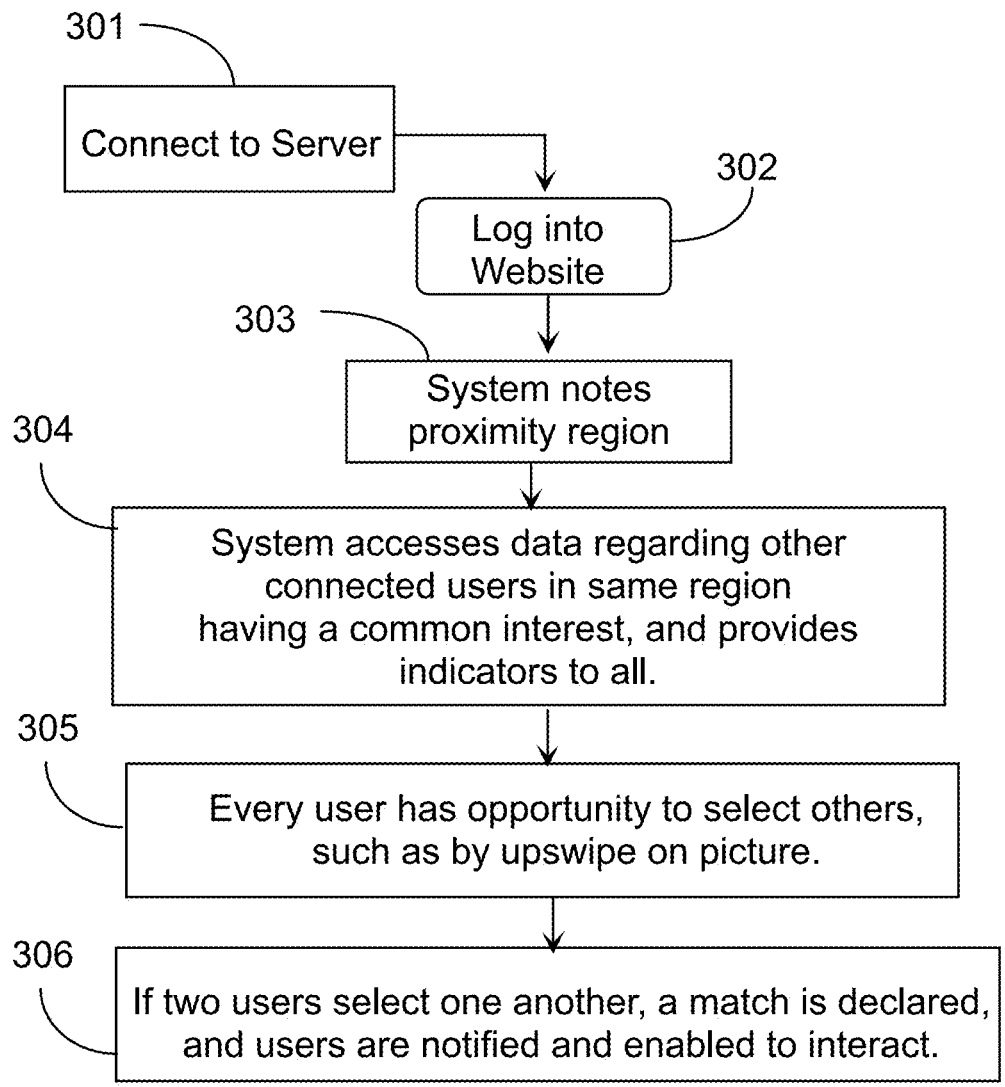
FIG. 3 is a process flow chart depicting steps for selecting a presented activity or interest and initiating match processing.

FIG. 3 is a process flow chart depicting steps for seeking a match through the system of the invention. At step 301, the user may connect to the server through the client application analogous to application 114 of FIG. 1. At step 302, the user may perform a log-in procedure for security authentication. At step 303, the matching service determines a region proximal to the connecting user. This may be a pre-defined area in size, may be a city or county, or may be just about any other definition, and may also be amenable to adjustment by users in real time. At step 304, the system accesses data regarding other connected users in same region having a common interest, according to the registered user's profiles, and provides indicators of each such user to others. A search for other users may be specific to each connected user according to preferences entered in user's profile. For example, one female user may restrict potential matches to other female users, excluding males.

The system processes a continuing search for registered users who are active with cell phones on and the App for the invention executing, that are in a defined region. This process may be defined in different ways. For example, the system may define a region boundary based on a GPS location of all or a portion of registered users active in some proximity. Alternatively, there may be specifically defined regions, like a city, a town, or a section of a city. In some embodiments, regions may be defined based on a geographic location of one or more businesses. For example, in some cases common interests may be noted, such as, for example, movies, and users may be reported that are within one mile of a particular theatre, which happens to be a registered business with the system.

Every user, at step 305 has opportunity to select other users with which he or she may wish to match. This selection may be by a defined touch-screen motion on a picture or icon associated with another user. No indicator, it is emphasized, is sent to another user as a result of this selection. If two or more users select one another, then the system declares a match. A match is thus determined by geographic proximity, at least one common activity interest, and by a mutual personal interest. This is not done by invitation and response.

Figure 4:
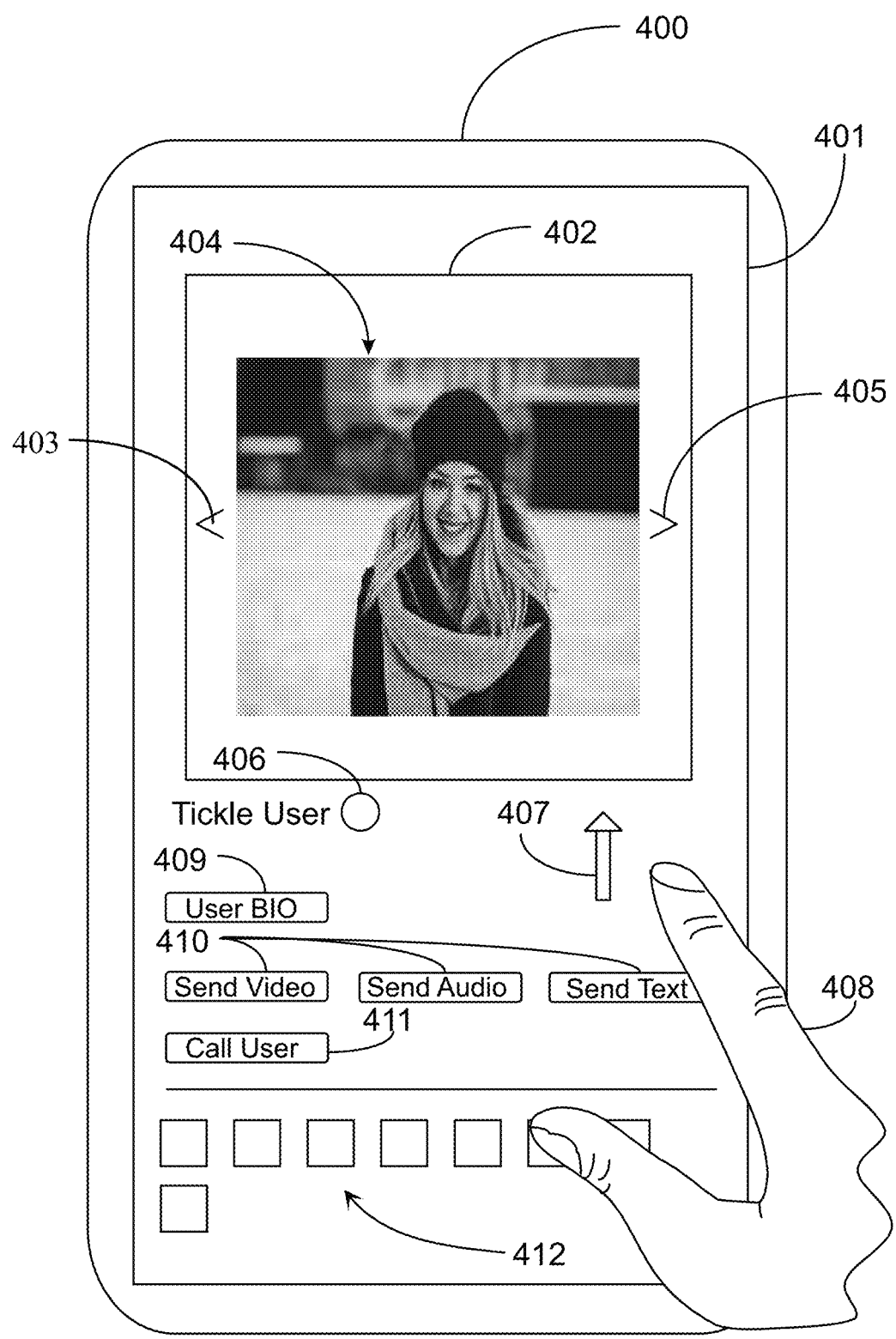
FIG. 4 is a process flow chart depicting steps for selecting a least one user to invite to participate in an activity or interest.

FIG. 4 is a front elevation view of a smart phone 400, analogous to device 110 of FIG. 1. In this example the user of smart phone 400 has initiated the system APP (114), which is executing. As described above, the system conducts a continuing survey, a search, for registered users with common interests in GPS proximity to the user of smart phone 400 and provides an indication of these other users to each user active in the region and having a common interest.

The depiction of smart phone 400 in this example may be taken for any active user discovered in the subject region. In this example, the indicator is a still photo of the other active users, and one such active user is indicated by photo 404 in window 402 in display 401 of device 400.

There may be no other active users in the region with a common interest, in which case there will be no indicator, such as a picture of another user. There may be just one, and photo 404 is then the one. There may, however, be a plurality of active users with common interest in the region. In the circumstance of a plurality, then the user of device 400 may scroll through the other user's photos (or other indication). Buttons 403 and 405 are for this purpose. Alternatively, a user may swipe left or right on the screen to scroll through indicators for other users. Further, a collection of thumbnails 412 may indicate the other active users found, and the instant user may select a thumbnail to display the photo or other indicator.

The instant user knows that each of the photos is for another user who has a common interest, and the instant user may submit an interest in another user to the system. This may be done, for example, by an up swipe on the touch-screen, as indicated by element 407. This indication of interest in another user is sent to the system, not to the other user. There is no direct invitation. Every user has opportunity to indicate an interest in other users as well. In the circumstance that the instant user swiped up on the photo shown, and the user represented in the photo also swipes up on a photo on her screen of the instant user, then the system declares a match.

Once a match is declared, then the system enables communication between the users in the match, which may be two, or more than two. In some embodiments the instant user may access additional information regarding the user associated with a photo, by a selection button 409 labeled "User Bio". The further information presented may be a function of specific programming in App 114, and the ability to access same is optional, and does not appear in all embodiments.

Communication enabled with a match is represented by links 410 and 411. In some embodiments only a telephone call is enabled, and the call may be routed by the link without showing the other user's phone number. In some embodiment text, and transmission of stored audio and video may be enabled. Third-party apps like Facetime™ or SKYPE™ may be leveraged as well.

As a result of a match, matched users may choose to meet, and in p-articular may choose to meet at a business or other venue hosted by a registered business partner in the system. Information about such businesses may be by link (not shown) or may pop up on the user's respective displays.

A match for the instant user is a propitious result but may not occur in every circumstance. In embodiments of the invention an additional feature, termed by the inventor a "Tickle", may be incorporated. A tickle button 406 is indicated in FIG. 4. This button may take iconic form, or may comprises just a different, and recognizable, swipe pattern on the screen, proximate or over an indicator of a user that the instant user may wish to accomplish a match.

The instant user may tickle any one or more of the other users active in the area and having a common interest. The tickle may cause the other user's phone to vibrate or may play a pre-programmed audio. If the tickled user tickles back, then the system declares a match, and then the match proceeds as described above, with the matched users enabled to directly communicate and interact in other ways.

Figure 5:
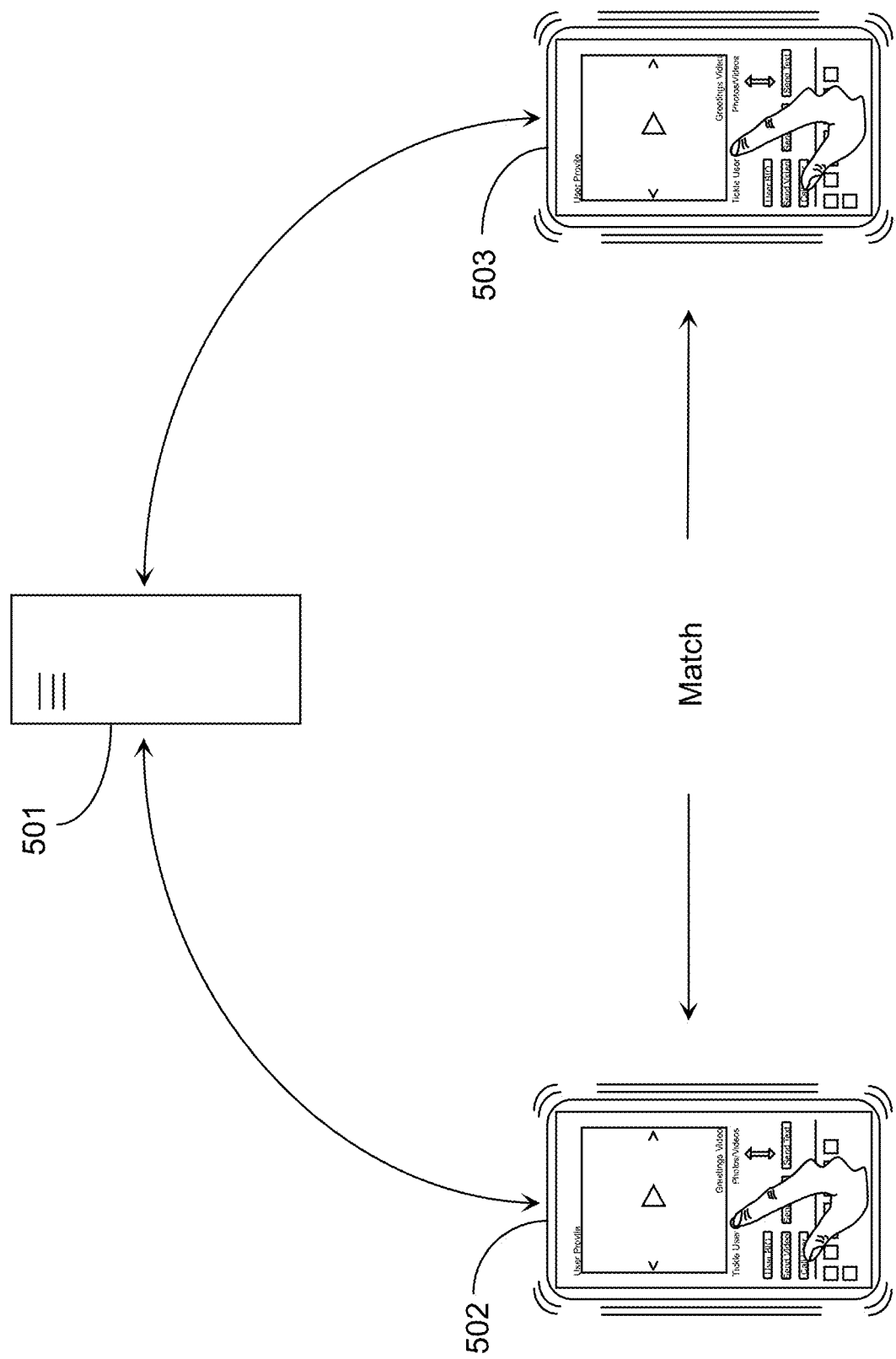
FIG. 5 is a process flow chart depicting steps for completing a match between users interested in a same activity or interest.

FIG. 5 is a block diagram depicting two users matching through the tickle feature according to an embodiment of the invention. In one embodiment of the invention, one user may tickle another user electronically in a request to match, whereby the notified user may tickle back completing a match. In this embodiment, a user 502 operating a smart phone has accessed an indicator associated with a user 503. User 502 may hit the tickle button sending the command to the owner of the tickled profile 503 through the brokering server 501. Server 501 maybe analogous to server 103 of FIG. 1.

The matching service (not illustrated) analogous to SW 113 on server 103 of FIG. 1 operating on server 701 in this embodiment may notify user 503 by turning on the vibration feature of the user's smart phone. User 503 may be presented the tickling user's picture, or in some case more profile information for review. During review the tickled user may tickle the first user back. This action causes server 501 to determine a match is made and notifies the original user by vibrating feature. Sounds may also be used to identify notifications.

Once users 502 and 503 have matched by tickling, the matching service may enable contact options providing communication at least through the matching service. In one embodiment, contact may be pursued directly between the user devices without the brokering server after a match has been made. However, browsing user indicators and tickle or swiping for approval for matching must be performed while the devices are connected to the brokering server through the client applications analogous to applications 114 of FIG. 1.

Figure 6:
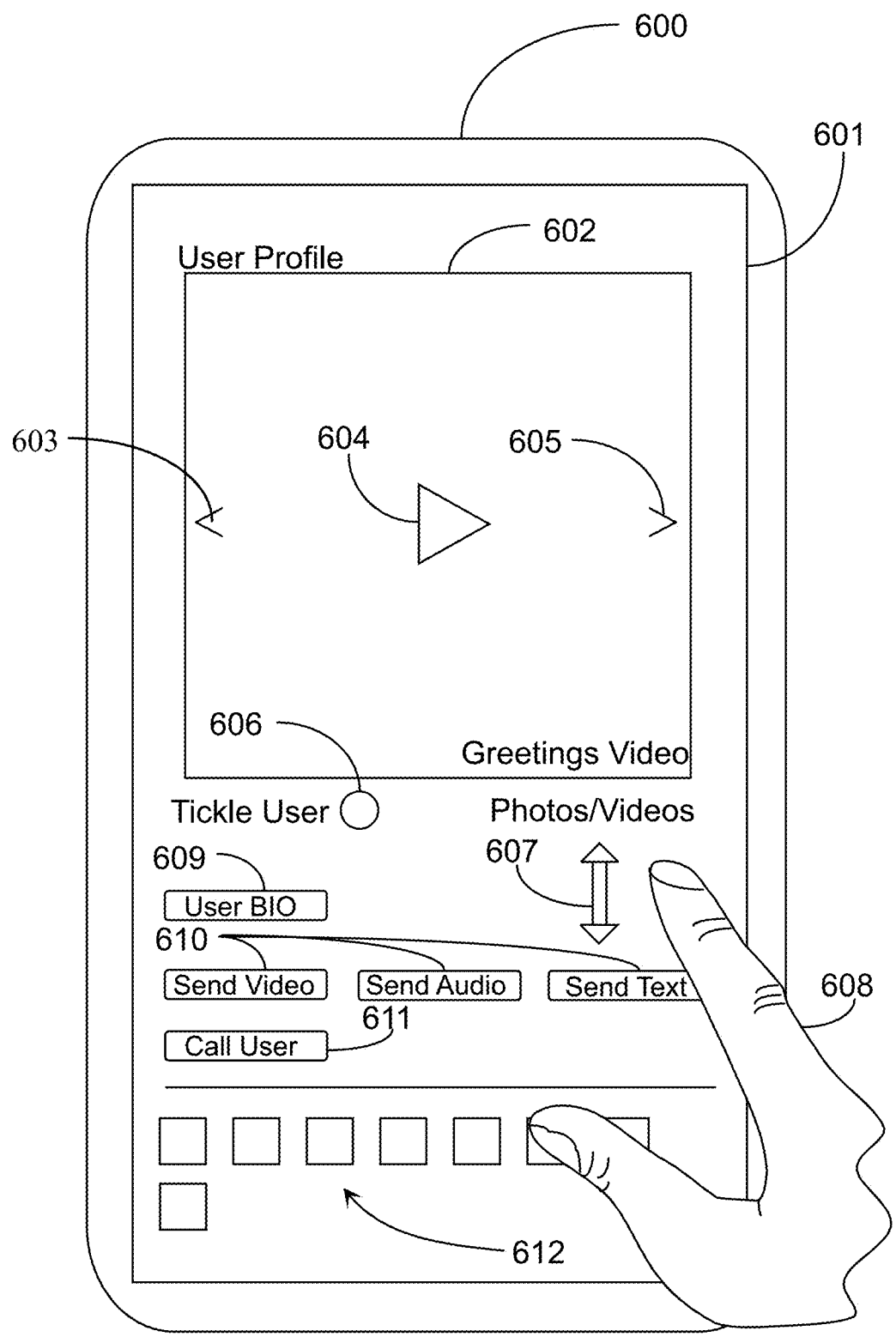
FIG. 6 is a front elevation view of a smart phone depicting a user profile and associated options.

FIG. 6 is a front elevation view of a device 601 used by a mobile user operating a smart phone 601 and interacting with an interactive map of locations according to an embodiment of the invention. In one embodiment, locations, hosted by registered enterprises, may be presented in an interactive map and may be tickled to enable registered users to visit a site profile that includes current information about the location including any events or activities ongoing and scheduled.

In this embodiment, a tickle spot screen 602 may be accessed and utilized to search locations that may be participating businesses and that may include an interactive profile that may be tickled or matched in a way similar to matching users. In this embodiment there is a search option 607 enabling a user to search for locations, and a search option 608 enabling a user to search for events hosted by one or more locations. A user may employ one or both options by entering key words and or phrases. An interactive map 603 may be returned by a server after a search is conducted by a user. Interactive map 603 may show locations as interactive icons 604 overlaid on the map. Each location icon 604 may represent a GPS coordinate and a location profile interactive link that may be navigated from the interactive map to visit a location profile. A user may tickle the profile to check into the location to see what is going on currently and who else may be checked into the location.

In some circumstances one checks into a location when one is present at that location. A user may check in also to see what is currently happening at a location and who else may be at the location as evidenced by them checking in while visiting the location. A user may visit a location by touching the location's icon 604. User 606 may hover over the icon to obtain summary data such as the location name and address and perhaps contact number. The user may click on the icon to open a location electronically as far as enabling the user to visit the location profile. Icons 604 may be hearts or pin or any other symbol that may represent a location. In one embodiment a location may be partially defined by the type of icon 604.

A user that is visiting a registered location may check into the location through the client application and may access and contribute to that location's storyboard by uploading a picture or a video clip or a review, for example. Users will be enabled to check into tickle spots (locations/events) via the application by using the device's location and perhaps a pre-defined radius. When a user visits a tickle spot (location/event) they may be sent a notification asking if they would like to check in. Users may be enabled to choose if they would like to check in to a location or event or not. If user decides to check in to a location, their indicator, such as a photo, may be displayed on the location's profile page for other users to see. Other users may access the displayed profile and request direct match with them through the tickle feature located on their profiles analogous to tickle feature 406 of FIG. 4.

Users may search for nearby locations and see how many users have checked into that location as well as view their profiles. When users leave, they may be notified if they wish to check out. When users check in to places or events, they may be able to collect reward points from that location and use them to redeem deals or special offers. If a user searches for an event, locations hosting the event or event type may be displayed for the user in interactive map 603. A user may also search more narrowly for a specific type of location such as a bowling alley, a miniature golf course, a swimming pool or sports complex, for example. In one embodiment, the search features include a user option for setting a radius around the user's current GPS location.

In one embodiment, a user browsing locations may save location profiles referenced herein as location profile thumbnails 609. Location profile thumbnails 609 are interactive and may be executed from the user's device while the user is connected to the matching server to visit the location profile and check in if desired. Location profile thumbnails 609 may be updated each time a user makes a connection with the matching service or when a thumbnail is selected while connected to the matching server.

In one embodiment the matching service of the invention may include logic that enables the system to recognize user and location profiles and images and videos users look through and may use that pattern history to discover similar users/profiles to aid in presenting more refined matches to other users. The matching service logic enables system recognition of locations and events users have checked into and have visited aiding in recommending through a system recommendation feature (not illustrated) possible locations and events for users to visit or attend.

In one embodiment, the matching service may discover locations that two local users have checked into aiding in discovering new similarities between know users and may be able to recommend locations to visit or events to attend that two users might enjoy based on observances made by the system. In a further embodiment, matching service logic may also include intelligence for verifying a real user profile verses a faked user profile.

Figure 7:
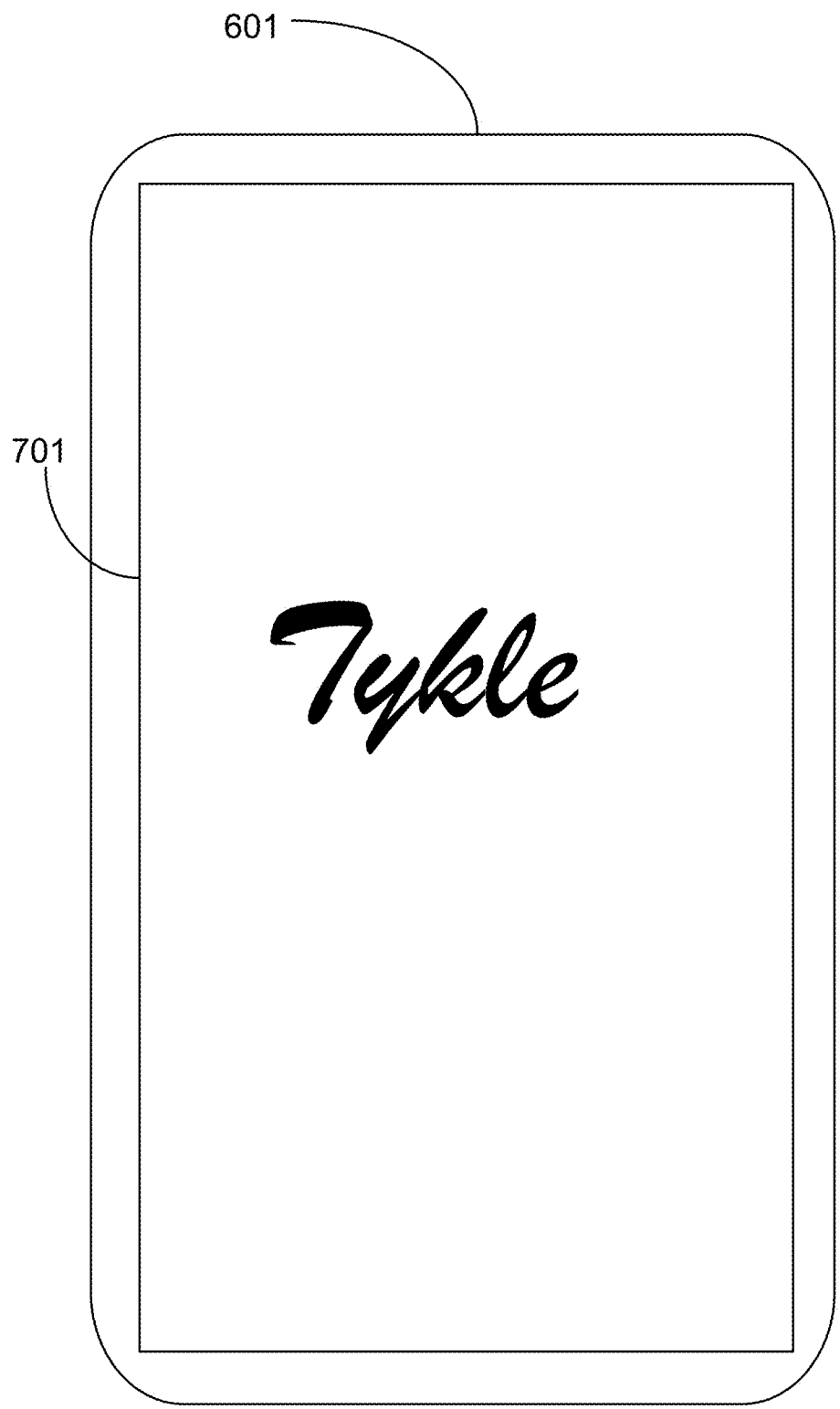
FIG. 7 is a block diagram depicting two mobile users matching for an event or activity through a tickle feature according to an embodiment of the invention.

FIGS. 7-17 illustrate interactive interfaces on a mobile device for operation of a system of the invention in an alternative embodiment. FIG. 7 is a first screen 701 that appears on mobile device 601 when the Tykle App is loaded in this embodiment, simply identifying the app as the Tykle App. This screen appears just for a short period, and may have a background color, perhaps pink in some embodiments.

Figure 8:
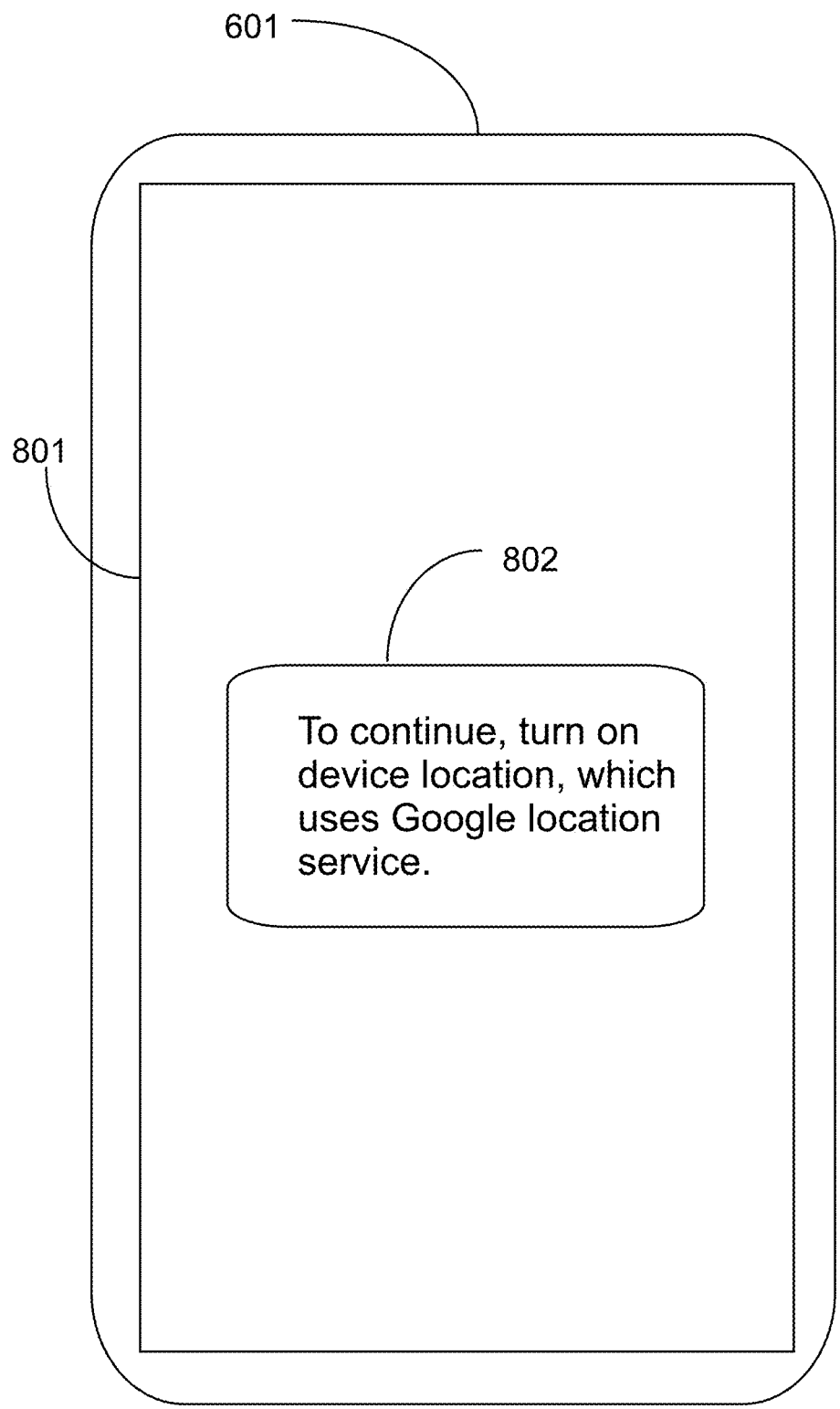
FIG. 8 is a screen with an instruction in an embodiment of the invention.
Figure 9:
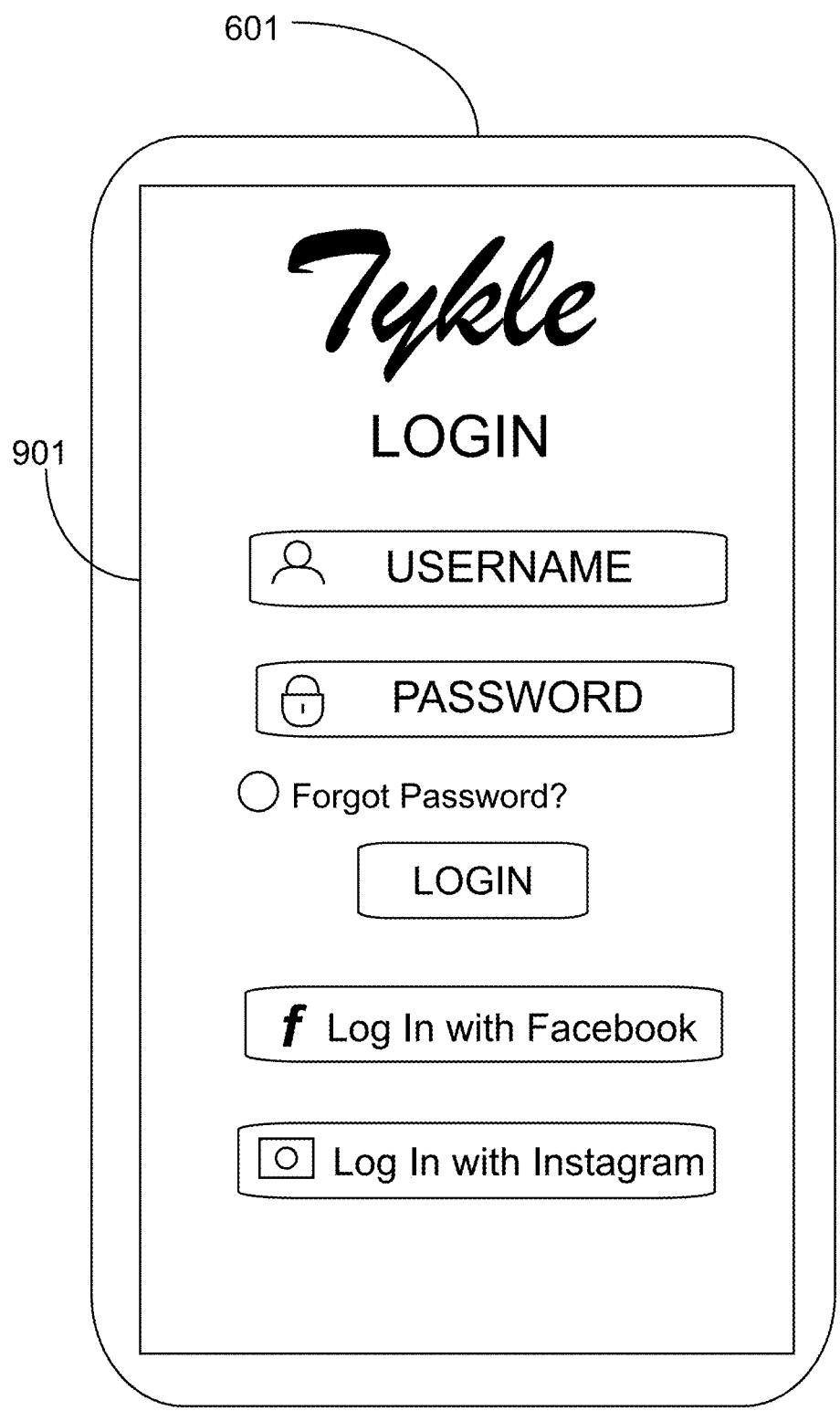
FIG. 9 is a LogIn screen in an embodiment of the invention.
Figure 10:
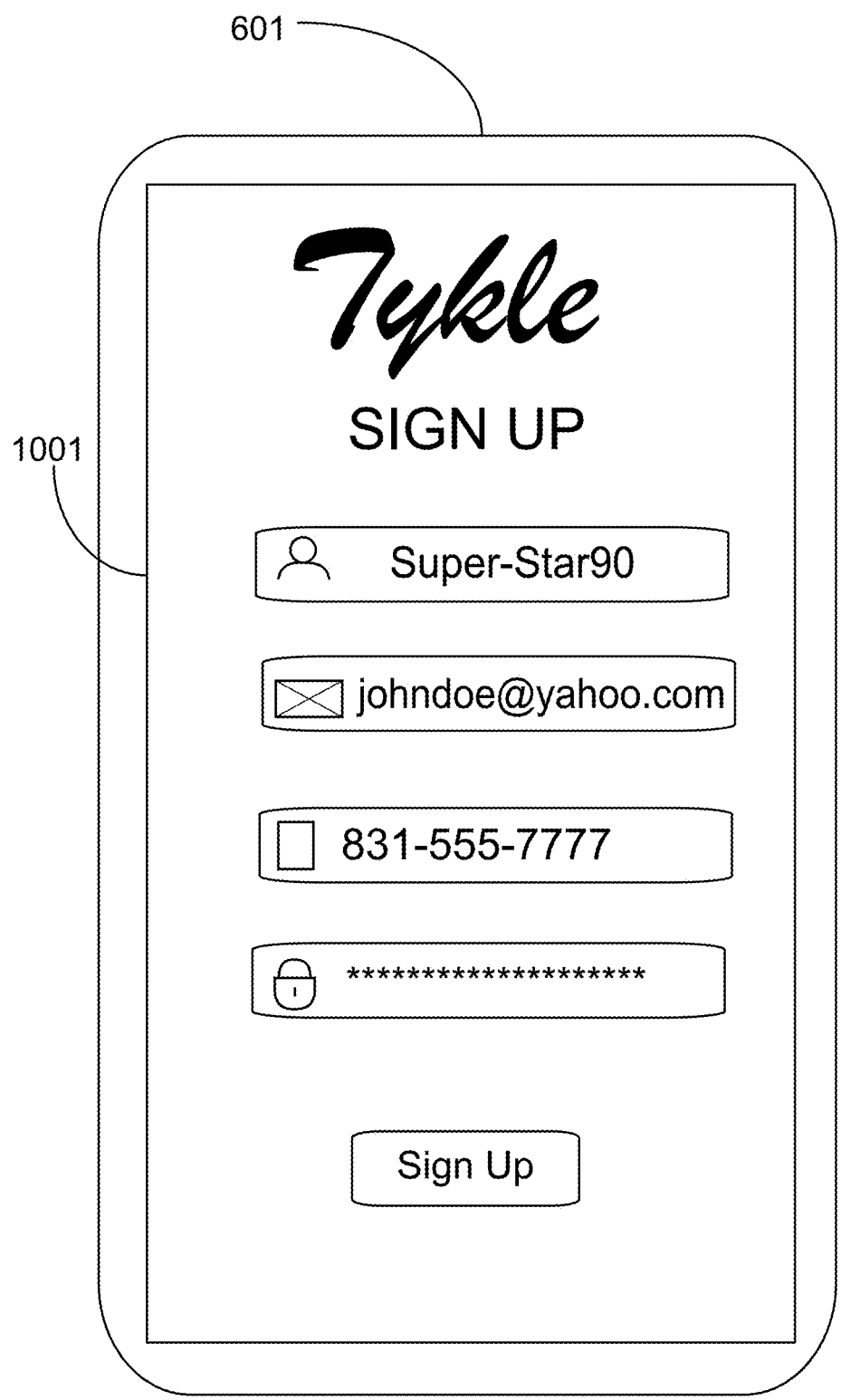
FIG. 10 is a sign-up screen in an embodiment of the invention.
Figure 11:
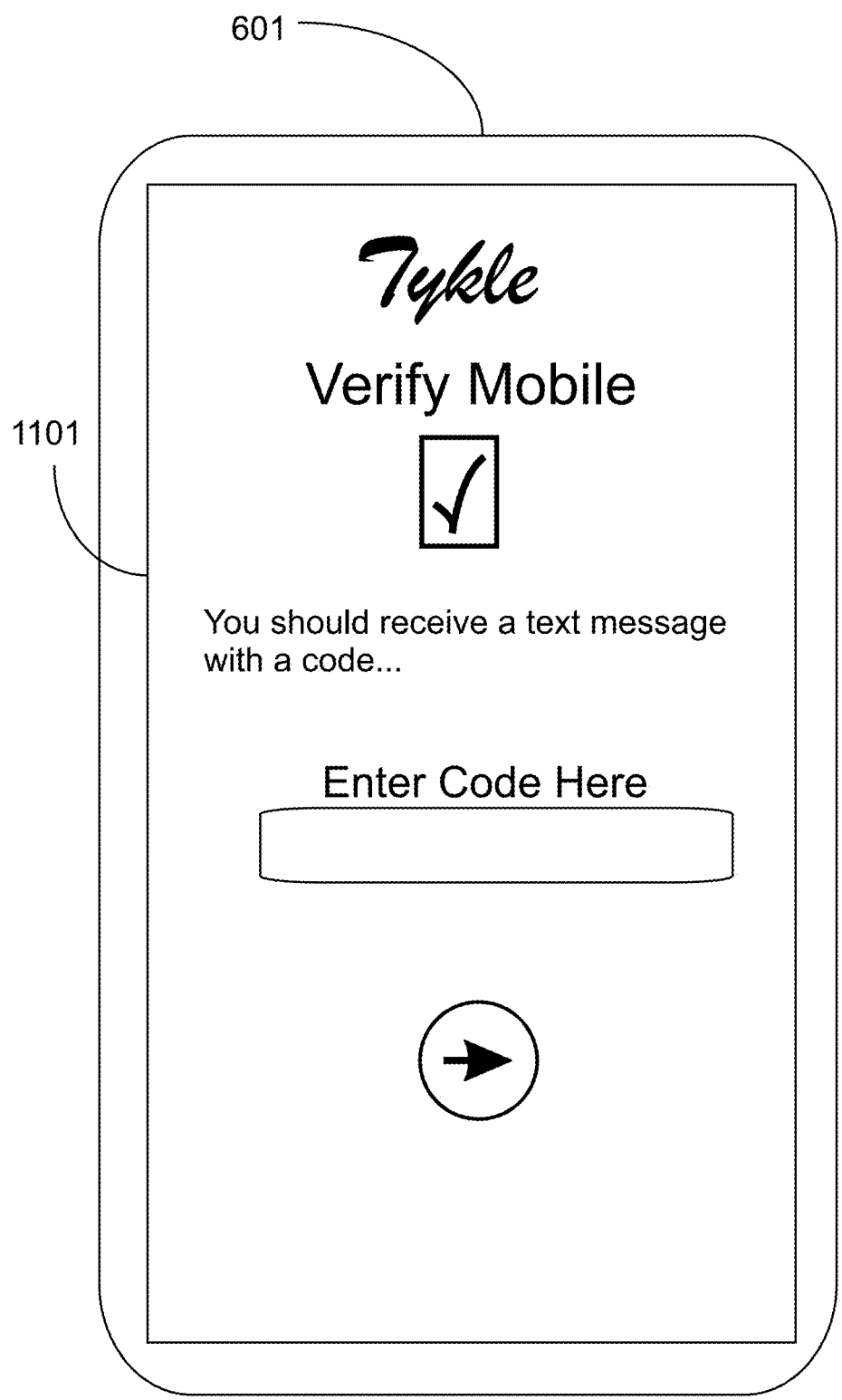
FIG. 11 is a mobile-verification screen in an embodiment of the invention.

FIG. 8 is a screen 801 with a window 802 announcing that the user must turn on the devices location system to continue to use the App. FIG. 9 is a LogIn screen that is conventional and appears after the notification screen of FIG. 8. The user may enter Username and Password to log in. FIG. 10 is a signup screen for persons who are not yet registered, and provides text fields for entering a Username, an Email address, a telephone number, and a password, and then completing the process, selecting the link "Sign Up".

Figure 12:
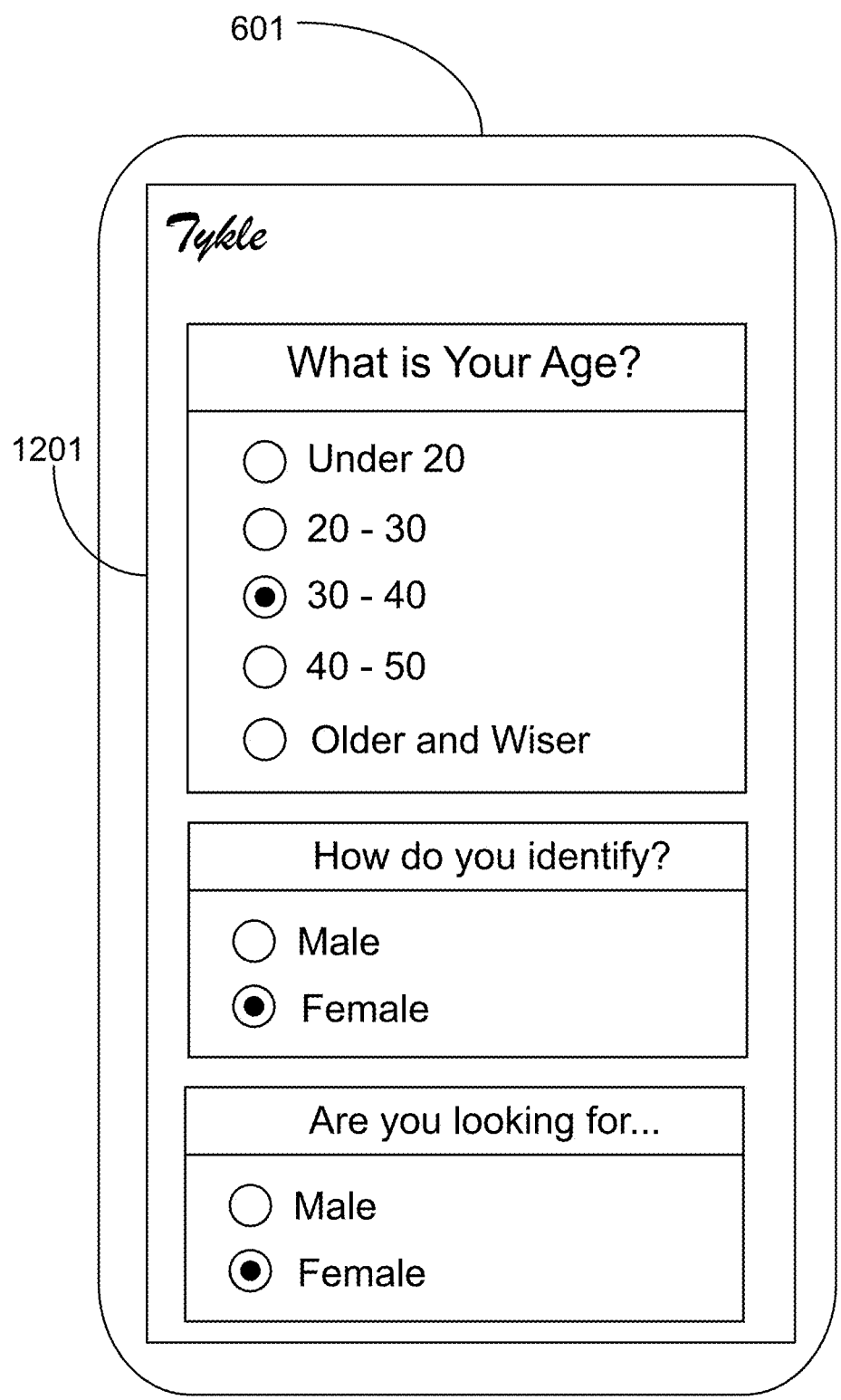
FIG. 12 is a screen for entering profile information in an embodiment of the invention.

The next step is to verify the new user's mobile device. An email with a code is sent by text to the number entered in the interface shown by FIG. 10, and the new user is asked to enter the code in FIG. 11, then click on the arrow to continue. After the mobile device is verified, the new user is expected to build a profile. FIG. 12 present a series of questions to the new user to create a demographic in the user's profile. A limited number of questions show in FIG. 12, but there are typically also queries regarding language and profession, for example. In some cases, additional questions may be presented in a next screen, and in some cases the screen may scroll. When all questions are answered there is a "NEXT" button to go on. At the end of the questions there may be a text field asking the new member to enter a self-description. Then there is a link "Done" to end the question process for profile.

After the questions are answered, the user is asked to create a personal video. This may be done offline, and uploaded, or may be created in real time through the app. and the user's mobile device camera. The user is enabled also to enhance the video with such as stickers, gifs, filters and effects.

Figure 13:
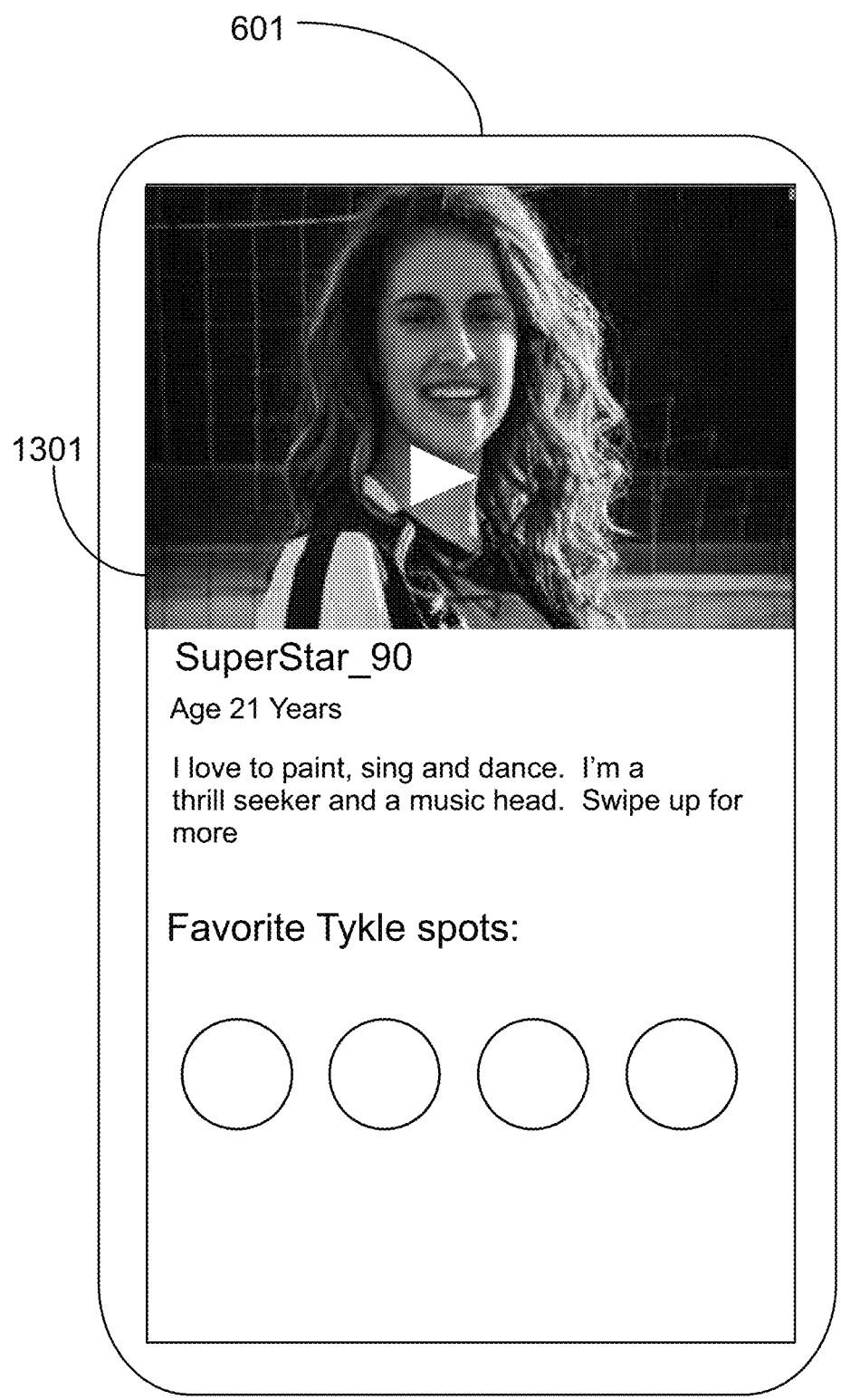
FIG. 13 is a screen showing profile information for a user in an embodiment of the invention.

FIG. 13 illustrates a screen after uploading the personal video, and for selecting Tykle Spots. The user's primary video is shown and playable, and the user's personal self-description is shown as well. The user may upload additional pictures and additional videos as well. The favorite Tykle Spots refer to locations of enterprises that are registered with the Tykle enterprise, as described more fully above. These spots may include clubs, bars, movie houses, parks, and other entertainment enterprises and locations, and may be accessed by a user at the Tykle site and selected for favorite and for other purposes as well, as described more fully below.

Figure 14:
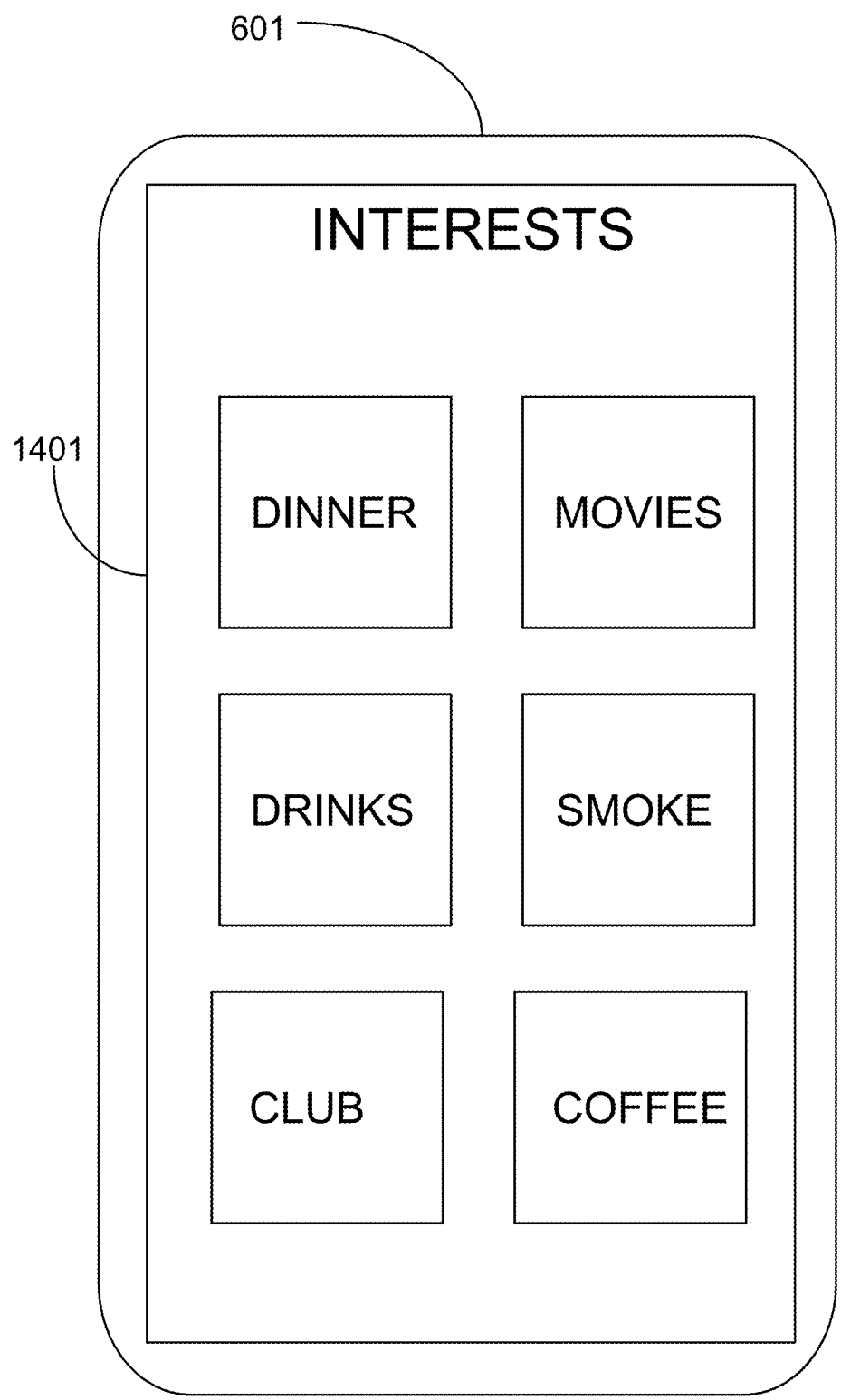
FIG. 14 is a screen enabling a user to declare an interest in an embodiment of the invention.

FIG. 14 is a screen that appears when a first user goes active by booting the App and is seeking companionship. A list of interests is presented to the first user, and the first user may select one or more interests. By so doing the first user is declaring that he or she is seeking companionship to participate in a common activity. Let us assume for description that there are five other users in the region with the App booted and active, and that have also selected in their own screen an interest common with an interest selected by our first user. Profile info for these five registered users will be presented to our first user. Also, profile information will be presented to each of the six registered users for the other five in each case. That is, everyone in the region with an active App and a common interest will be introduced to every other such user. Each user with a common interest is indicated in the App of each other active user as, in many cases, a photo. The indication could, however, be just a name, or another indicator. The indicator is meant to be a portal to the user's profile.

The way it works in this embodiment is that each user may consider the profile of the other five and may indicate an interest by an agreed-to action, in this embodiment by an upward swipe on the picture of another user. Alternatively, there may be a heart button that a user may click to indicate an interest.

Assume our first user up-swipes on user four, and user four also up-swipes on our first user. The system in this circumstance declares a match. If there are several users introduced with a common interest each user may scroll through the profile info for the other users. Each user may review other user's videos, pics, and other profile info. In one embodiment the screen presenting other users will show Tykle spots in common, which may be presented as thumbnails across a lower portion of the screen. Users are given a rich data set with which to consider and make decisions.

Figure 15:
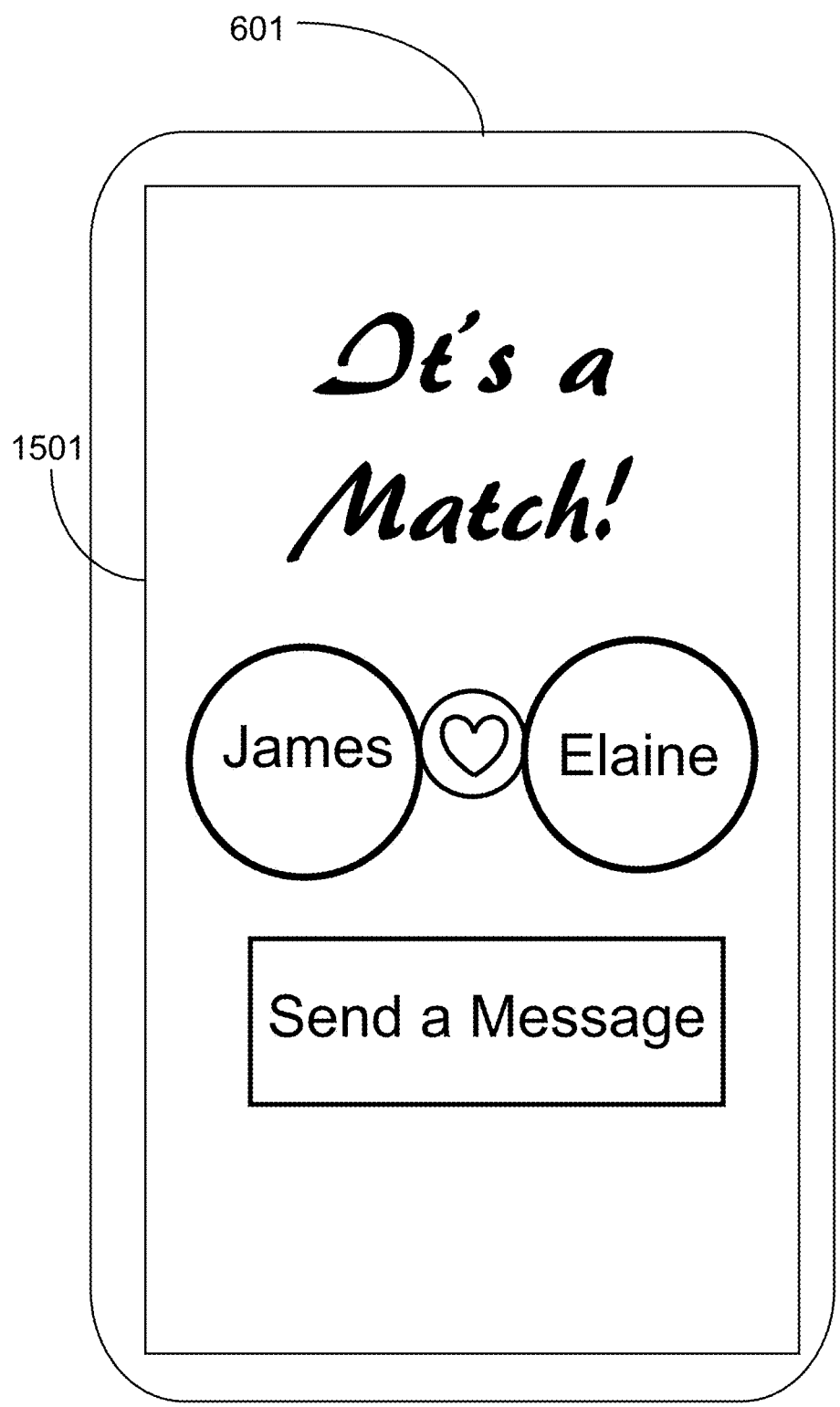
FIG. 15 is a screen indicating a match has been declared in an embodiment of the invention.

FIG. 15 is an example of a screen presented to both users who are a part of a match when a match is declared by the system. The fact of a Match declared is announced as "It's a Match". An indication of the users in the match is displayed side-by-side, in this case separated by a heart symbol. The indicators may be names, or perhaps pictures as well as names. The skilled person will understand that the graphics and presentation may actually be done in a variety of ways. A link is provided in this example to send a message, or to communicate in any number of possible ways.

Figure 16:
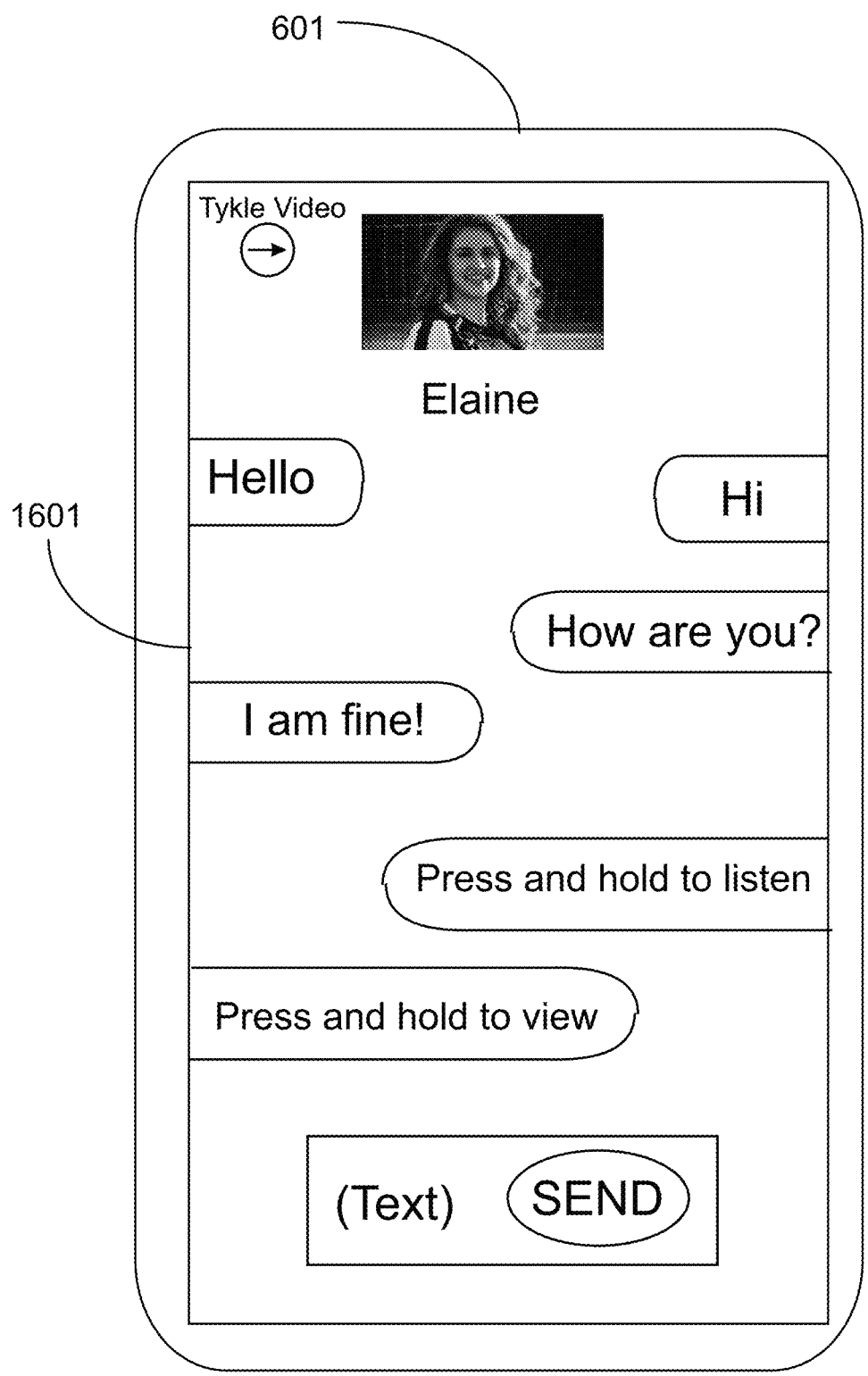
FIG. 16 is a communication screen in an embodiment of the invention.

FIG. 16 is an example of a screen that may appear in response to one or the other user, or both, initiating the "send a message" link. A variety of communication channels may be selected and used, such as Chat, Text, Telephone, video, and more. The opposite person in a match is displayed to the instant user, in this case Elaine is presented to James. James can ask for, and in some cases command, profile information, such as personal videos of Elaine. The match may, in some circumstances, go no further than communication, bat through mutual engagement and agreement the parties may agree to meet, to share an activity, and may meet at an enterprise also registered to the system, termed in many instances a "Tykle Spot".

Figure 17:
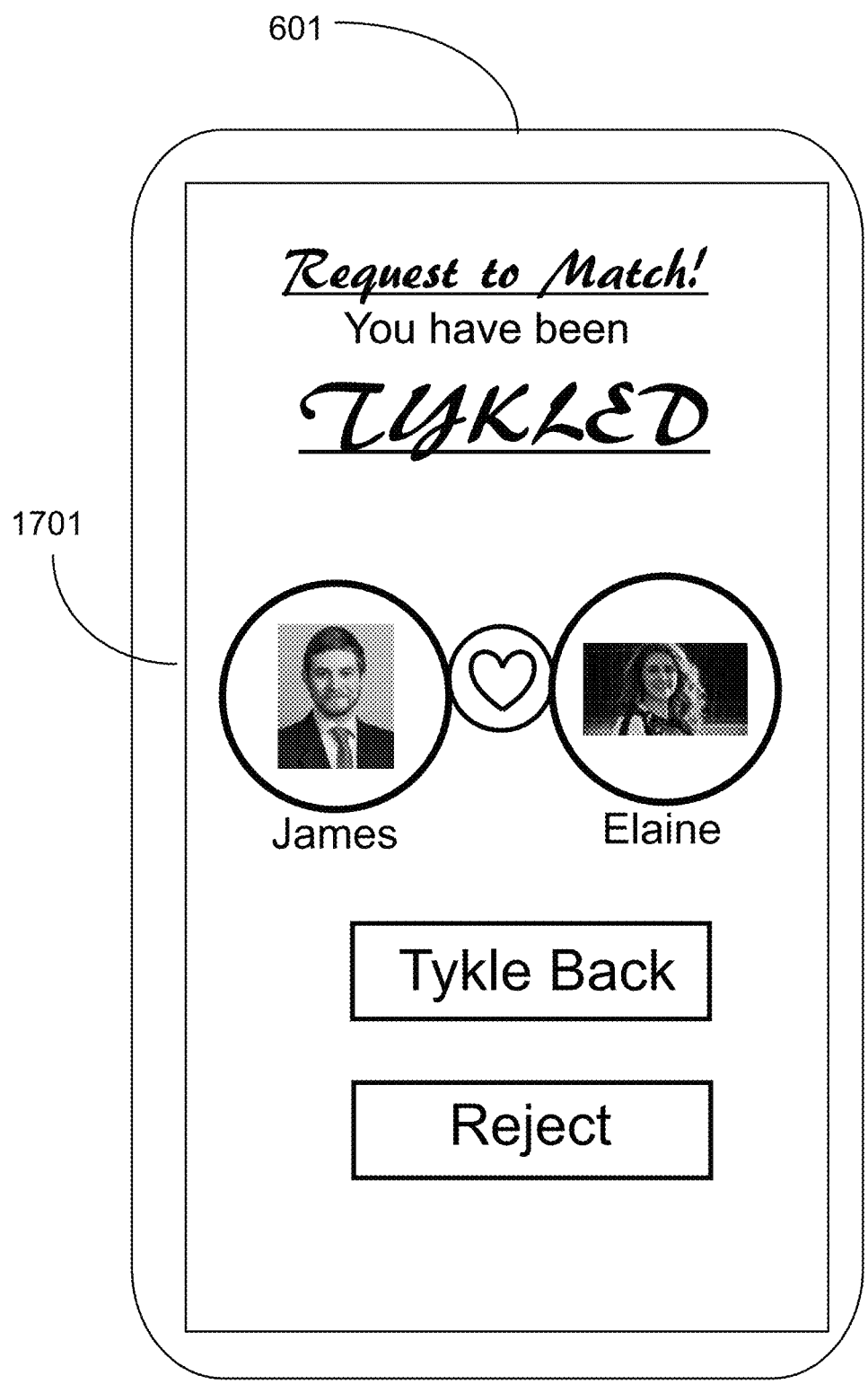
FIG. 17 is a screen showing a user has been selected in a request to match in an embodiment of the invention.

In some circumstances there may be displays of users with a common interest in real time, but no match declared by the system because requirements of mutual interest are not met. In such a circumstance each user being presented to others as having a common interest may then be afforded an avenue to directly request a match. In this circumstance there may be a Tykle button presented in an interactive interface that may have an iconic form, like a heart or other icon, and a user may select an indicator for another user in the vicinity that also has a common interest, and use the Tykle Button to Tykle that user with a request for a match. The other user will get a screen as shown in FIG. 17 showing the Tykler and the Tykled. A link "Tykle Back" enables the Tykled user to respond that he/she agrees to a match to be declared. Otherwise the Tykled user may reject the Tykle. Agreement produces a match, just as a match declared by the system, and opens communication channels between the users.

In some embodiments the communication channels that are opened are specifically through the Tykle system, and a user's phone number and other private contact information is not shared. Users may, however, share the more private information at their own decision and agreement.

In most screens as interactive interfaces a sidebar is available enabling a user to (a) view and edit the user's profile; (b) review previous matches; (c) send messages; (d) contact the Tykle staff; (e) access a Help system with FAQ and help topics, and to Logout.

In some embodiments there may be an association made between interests, as shown in FIG. 14, and Tykle Spots as enterprises that are registered members of the Tykle enterprise. The association may be shown, for example, by, for example a right click on the "Dinner" interest in the interface of FIG. 14. This selection may produce a map that will show restaurants in the vicinity of the user making the selection. The map may be interactive, such that profile information for the restaurants may be accessed, pictures, videos, directions, menus, and the like. Similarly, if the user right clicks movies, movie houses in the vicinity may be shown and now playing lists and the like may be accessed. The additional information may be displayed in additional screens for the user, and the user may be able to select the information desired.

In some embodiments, enterprises may be enabled to Tykle users that are seen to be in the vicinity, whether or not the users have Tykled the enterprise, and may be able to offer special accommodations and the like. Users may be able to accept this feature or not.

In some embodiments registered individual users and registered enterprises may have a deeper association. For example, enterprises may archive storyboards associated with users, which may be initiated in some circumstances by an enterprise, and in other circumstances by the individual users. Users may in some circumstances upload videos and other multimedia material to storyboards. These storyboards may be videos of joint activities of matched users at specific enterprises and may in some circumstances be accessed and downloaded by users. Privacy rules may be agreed to and enforced.

The skilled person will recognize that the descriptions above are exemplary only, and not limiting to the scope of the invention. The invention is limited only by the claims.

I claim:

1. A social interaction system, comprising:
  a network-connected server executing software from a non-transitory medium coupled to a data repository;
  a plurality of network-connected smart phones by which individual members are enabled to communicate with the server and with one another, each smart phone executing a global-positioning system (GPS) application, and each smart phone associated with a specific individual member;
  an application executing on individual ones of the smart phones, the application providing interactive interfaces on a touch screen of the smart phones by which the individual members are enabled to interact with functions of the server and with smart phones of other individual members, the functions provided through execution of the software at the server;
  individual member profiles stored in the data repository created by the individual members using specifically the smart phone associated with the individual member, the member profiles comprising photographs captured by the smart phone associated with the individual member creating the profile, a biography comprising age, education, gender, birthplace, education history, and professional history, a greeting video created by the individual member using the smart phone associated with the individual member creating the profile, and a list of interests;
  business profiles stored in the data repository identifying business members of the social interaction system, the business profiles comprising name, nature and location of the business, and information regarding real-time activity at the business;
  wherein the system dynamically creates geographic regions determined by OPS coordinates of both individual members whose smart phones are active, GPS location of member businesses and GPS proximity of the individual member's active smart phones and GPS locations of member businesses, and wherein, upon a first member becoming active in a specific region by logging into the application using the network-connected smart phone, the system presents to that newly active first member on the touch screen of the smart phone associated with that member, a specific list of activity interests, and invites the first member to select one or more of the activity interests presented, wherein, upon the first member selecting one or more of the activity interests, indicates to the first member an identifier and a photo from the profiles for second members who are both active in the same region, and who have selected an activity interest common to one of the activity interests selected by the first member, and wherein the first member is then enabled by a specific touchscreen action to communicate to the system at the server an interest in one of the second members active in the same region and having indicated a common activity interest, and wherein the system then indicates to the second member the interest of the first member, and enables the second member to respond interested or not interested, and if the response of the second member is interested, declares a match, and, upon a match being declared the first member is enabled by links in an interactive interface on the touchscreen of the smart phone, to access the biography in the second members profile, to initiate a telephone call initiated through the system without revealing the first member's telephone number, to send the greeting video from the first member's profile, to send a text message, and to activate communication by Facetime™ or Skype™, and wherein the first and second members matched are made aware of member businesses within the region, and wherein information about member businesses active in the region a provided to both the first and the second member either by link or by pop-up window, enabling the matched members to meet at one or another of the active member businesses in the region.

2. The social interaction system of claim 1 wherein the system provides to every member active in the region an on-screen indicator and photo for all other members active in the same region who have selected a common activity interest.

3. The social interaction system of claim 1 wherein there exist in member's profiles a plurality of photographs of second members active in the region with a common activity interest, and the first member is enabled in the interactive interface to scroll through the plurality of photographs of second members.

4. A social interaction method, comprising:
dynamically creating by software executing from a non-transitory medium on a network-connected server coupled to a data repository, geographic regions determined by GFS coordinates of both individual members whose smart phones are active, GPS location of member businesses, and GPS proximity of the individual member's active smart phones and GPS locations of member businesses;
registering individual members to a system and associating each individual member with a specific GPS-enabled smartphone by which registered individual members are enabled to communicate with the server and with one another;
providing an application executing on individual ones of the smart phones, the application providing interactive interfaces on a touch screen of the smart phones by which the individual members are enabled to interact with functions of the server and with smart phones of other individual members, the functions provided through execution of the software at the server;
storing individual member profiles in the data repository, the profiles created by the individual members using specifically the smart phone associated with the individual member, the member profiles comprising photographs captured by the smart phone associated with the individual member creating the profile, a biography comprising age, education, gender, birthplace, education history, and professional history, a greeting video created by the individual member using the smart phone associated with the individual member creating the profile, and a list of interests;
storing business profiles in the data repository identifying business members of the social interaction system, the business profiles comprising name, nature and location of the businesses, and information regarding real-time activity at the businesses;
upon a first member becoming active in a specific region by logging into the application using the network-connected smart phone, presenting to that newly active first member on the touch screen of the smart phone associated with that member, a list of activity interests;
inviting the first member to select one or more of the activity interests presented;
upon the first member selecting one or more of the activity interests, indicating to the first member an identifier and a photo from the profiles for second members who are active in the same region, and who have selected an activity interest common to one of the activity interests selected by the first member;
enabling the first member by a specific touchscreen action to communicate to the system at the server an interest in one of the second members active in the same region and having indicated a common activity interest;
indicating to the second member the interest of the first member, and enabling the second member to respond interested or not interested;
if the response of the second member is interested, declaring a match;
upon a match being declared enabling the first member by links in an interactive interface on the touchscreen of the smart phone, to access the biography in the second members profile, to initiate a telephone call initiated through the system without revealing the first member's telephone number, to send the greeting video from the first member's profile, to send a text message, and to activate communication by Facetime™ or Skype™, and
making the first and the second members matched aware of member businesses within the region, and wherein information about member businesses active in the region by link or by pop-up window, enabling the matched members to meet at one or another of the active member businesses in the region.

5. The social interaction method of claim 4 comprising the system providing to every member active in the region an on-screen indicator and photo for all other members active in the same region who have selected a common activity interest.

6. The social interaction method of claim 4 wherein there exist in member's profiles a plurality of photographs of second members active in the region with a common activity interest, comprising enabling the first member to scroll through the plurality of photographs of second members.

\* \* \* \* \*